W. H. KENNEDY.
COUPLING.
APPLICATION FILED JAN. 13, 1919.
1,341,135.
Patented May 25, 1920.
2 SHEETS—SHEET 1.
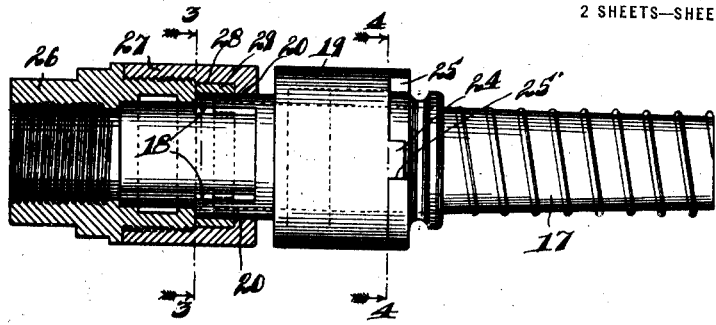
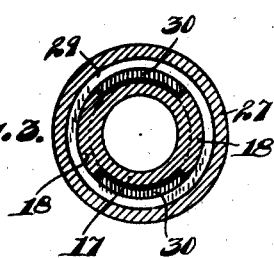 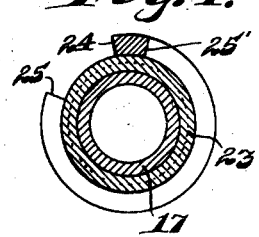 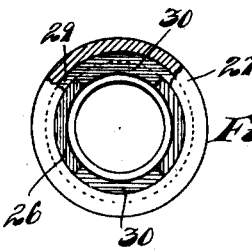
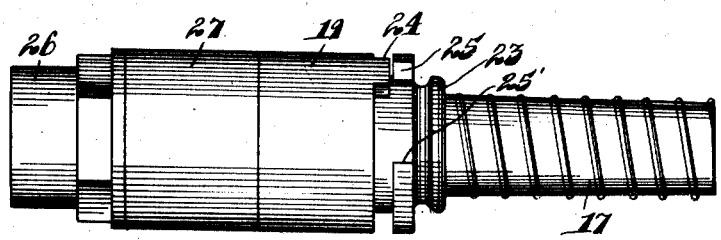
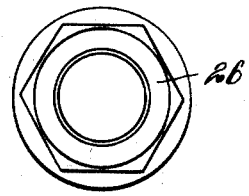
Witnesses:
C. E. Wessels.
A. A. Olson
Inventor:
William H. Kennedy,
By Joshua R. H. Potts
his Attorney.

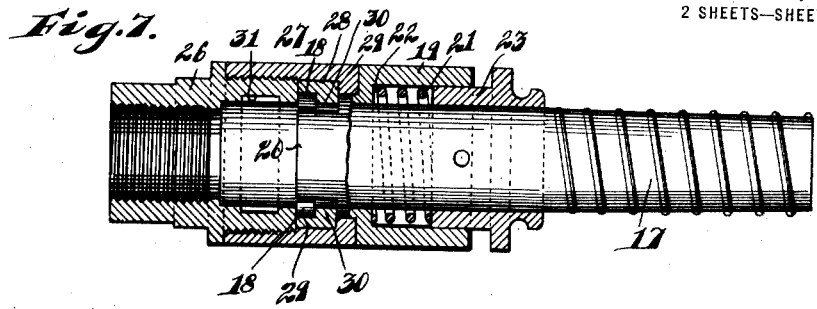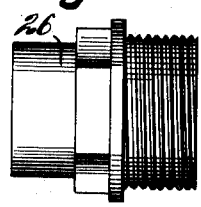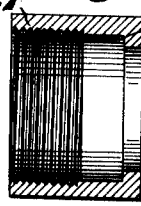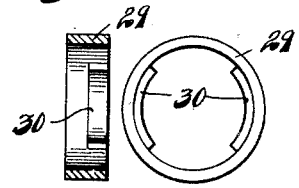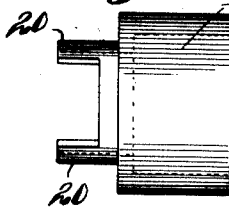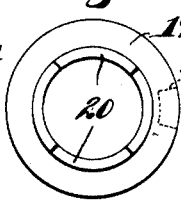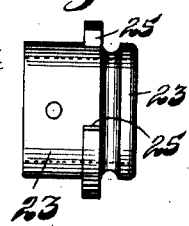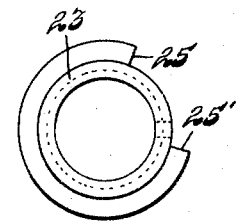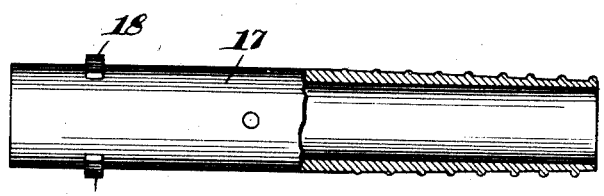

UNITED STATES PATENT OFFICE.

WILLIAM H. KENNEDY, OF CHICAGO, ILLINOIS.

COUPLING.

1,341,135.   Specification of Letters Patent.   Patented May 25, 1920.

Application filed January 13, 1919. Serial No. 270,854.

*To all whom it may concern:*

Be it known that I, WILLIAM H. KENNEDY, a citizen of the United States, and a resident of the city of Chicago, county of Cook, and State of Illinois, have invented certain new and useful Improvements in Couplings, of which the following is a specification.

My invention relates to improvements in couplings designed for use in connection with hose, piping, and the like, and has for its object the production of a coupling of this character which will permit of ready and expeditious coupling and uncoupling of sections of hose or pipe, and which, while producing an effective tight connection between the parts united, will also permit of relative rotary movement thereof.

Other objects will appear hereinafter.

The invention consists in the combinations and arrangements of parts hereinafter described and claimed.

The invention will be best understood by reference to the accompanying drawings forming a part of this specification, and in which, Figure 1, is a top plan view of a coupling embodying the invention, showing the parts thereof in fully interlocked relation, Fig. 2, a view similar to Fig. 1, with one part shown in section, and showing the relative position of the parts immediately before complete interlocking thereof, Figs. 3 and 4, sections taken on lines 3—3 and 4—4, respectively, of Fig. 2, Fig. 5, an end view of the female coupling member, a portion thereof being broken away and shown in section, Fig. 6, an end view of the female coupling member, as seen from the opposite end, Fig. 7, a sectional view of the coupling with the parts thereof in fully interlocked relation, Fig. 8, a side elevation of one of the parts of the female member, Fig. 9, a central section of another part of the female member, Fig. 10, an elevation of the loosely rotatable ring carried in the female coupling member, Fig. 11, a central section of the ring shown in Fig. 10, Fig. 12, a side elevation of the locking sleeve carried by the male coupling member, Fig. 13, an end view of said sleeve, Fig. 14, a side elevation of a stop collar carried by the male coupling member.

Fig. 15, an end view of said collar, and

Fig. 16, a side elevation, partly in section, of the male member.

The preferred form of construction, as illustrated in the drawings, comprises a male member 17, one end of which is formed for engagement with a hose or pipe. The opposite end of said member is provided with two spaced diametric lugs 18. Loosely mounted upon the member 17 for free shifting as well as rotary movement, is a locking sleeve 19 provided at its forward end with two diametric projections 20 adapted for registration with the lugs 18, as seen in Fig. 2, but adapted also to be received in the spaces between said lugs, as seen in Fig. 7. The sleeve 19 is normally pressed forward by a helical compression spring 21 arranged in said sleeve and engaging at one end against a shoulder 22 formed in said sleeve, the opposite end of said spring engaging against a stop collar 23 which is anchored to the member 17.

Rotary movement of the sleeve 19 from a position in which the projections 20 thereof are in full registration with the lugs 18 to a position in which said projections are out of registration with said lugs and in full registration with the spaces between the same, is limited by means of a projection 24 formed at the rearward end of said sleeve, said projection being movable between two stop shoulders 25 and 25′ formed upon collar 23. In other words, the arrangement is such that when the projection 24 is in engagement with the shoulder 25, the projections 20 will be in registration with the spaces between lugs 18, as seen in Fig. 7, and when said projection 24 is in engagement with the stop shoulder 25′, said projection 20 will be in full registration with said lugs 18, as seen in Fig. 2. The spring 21, as above mentioned, normally thrusts the sleeve 19 forwardly, so that in order to effect registration of the projections 20 with lugs 18, it is necessary first to retract said sleeve against the influence of said spring, to the position seen in Fig. 2, and then to rotate said sleeve to the desired position. When said sleeve is in its other position, namely, with the lugs 20 thereof out of registration with lugs 18, said spring acts to thrust the sleeve forwardly so that said projections move into the slots or openings between said lugs.

The female member comprises a tubular main part 26, upon which is threaded a second tubular part 27 forming an annular groove 28 within the part 27 in which is loosely rotatably mounted a ring 29 formed with spaced diametric lugs 30, as clearly seen in Fig 10. The lugs 30 are of a length corresponding substantially with the lugs 18 of male member 17, the spaces between said lugs 30 corresponding also in length with the spaces between said lugs 18. The female member is adapted to snugly receive the forward end of the male member, the female member 26 being provided with an internal annular packing 31 to engage with the adjacent end of the male member 17, when the parts are engaged, so as to insure a tight connection even though relative rotative movement of the parts is permitted.

In interlocking the parts of the coupling, the sleeve 19 is first retracted and rotated to a position in which the lugs 20 thereof engage behind and register with the lugs 18 upon male member 17. The forward end of the male member is then inserted into the female member with the lugs 18 and the forward ends of projections 20 passing into the spaces between lugs 30 in ring 29. The rearward end of male member 17 is then held in one hand, and with the other hand the sleeve 19 is then rotated to its other position, namely, to the position in which its projection 24 engages against stop shoulder 25. This rotation of said sleeve will cause the ring 29 to be carried with the projections 20 until the lugs 30 of said ring are positioned in alinement with and forwardly of the lugs 18 of male member 17. When the latter position is reached, the projections 20 will have been moved out of registration with the lugs 18, whereupon the spring 22 will thrust the sleeve 19 forwardly to the position seen in Fig. 7, or one in which the projections 20 will engage also with the spaces between lugs 18. In the latter position the projections 20 will serve the purpose of holding the lugs 18 and 30 in registration with each other, thus effecting locking of the parts of the coupling together, the free rotary movement permitted sleeve 29 allowing for the desired relative rotary movement between the parts of the coupling with the latter in fully interlocked relation.

In disconnecting the coupling parts, it is only necessary to retract the sleeve 19 and reversely rotate the same back to a position in which the projection 24 thereof engages against stop shoulder 25', since in this adjustment the projections 20 are retracted from engagement with the lugs 18, the sleeve 29 is rotated to bring the lugs 30 thereof out of registration with said lugs 18 and the projections 20 brought into registration with said lugs 18. When this position of the parts is reached, the male and female parts of the clutch are unlocked so as to permit of the desired separation of the same.

By providing the projection 24 and coöperating stop shoulders 25 and 25', it will be seen that a means of indicating the relative position of the lugs 18 and 30 is afforded, or, in other words, an arrangement is provided in which the locking sleeve is limited in its movement from a locking position at one terminal of its movement to an unlocking position at its other terminal of movement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. In a coupling, the combination with a female member, of a rotatably movable ring mounted in said member provided with lugs; a male member loose in the ring provided with lugs and engaging the lugs upon the ring; a locking sleeve loose upon the male member provided with projections engaging the lugs upon both the ring and the male member; means for causing engagement of said projections and lugs and preventing displacement of said members and allowing joint rotary movement of said lugs; and means for limiting relative rotary movement of said locking sleeve, said locking sleeve being longitudinally shiftable and resilient means coöperating with said locking sleeve to normally hold the same in a position in which the projection thereof will not, upon rotation of said sleeve, engage with said stops, substantially as described.

2. In a coupling, the combination with a female member, of a rotatably movable ring mounted in said member provided with lugs; a male member loose in the ring provided with lugs and engaging the lugs upon the ring; a locking sleeve loose upon the male member provided with projections engaging the lugs upon both the ring and the male member; means for causing engagement of said projections and lugs and preventing displacement of said members and allowing joint rotary movement of said lugs; and means for limiting relative rotary movement of said locking sleeve to and from a position in which the projections thereof register with the lugs of said male member, said means comprising stops on said male member and a projection on said sleeve engageable with said stops, said locking sleeve being longitudinally shiftable; and resilient means coöperating with said locking sleeve to normally hold the same in a position in which the projection thereof will not, upon rotation of said sleeve, engage with said stops, substantially as described.

In testimony whereof I have signed my name to this specification in the presence of two subscribing witnesses.

WILLIAM H. KENNEDY.

Witnesses:
    JOSHUA R. H. POTTS,
    HELEN F. LILLIS.